US006760723B2

(12) United States Patent
Oshinsky et al.

(10) Patent No.: US 6,760,723 B2
(45) Date of Patent: Jul. 6, 2004

(54) STORAGE MANAGEMENT ACROSS MULTIPLE TIME ZONES

(75) Inventors: David Alan Oshinsky, East Brunswick, NJ (US); Paul Ignatius, Jackson, NJ (US); Anand Prahlad, East Brunswick, NJ (US); Andreas May, Marlboro, NJ (US)

(73) Assignee: CommVault Systems Inc., Oceanport, NJ (US)

( * ) Notice: Subject to any disclaimer, the term of this patent is extended or adjusted under 35 U.S.C. 154(b) by 120 days.

(21) Appl. No.: 09/877,592

(22) Filed: Jun. 8, 2001

(65) Prior Publication Data

US 2001/0029512 A1 Oct. 11, 2001

Related U.S. Application Data

(63) Continuation-in-part of application No. 09/774,301, filed on Jan. 30, 2001, now Pat. No. 6,658,436.
(60) Provisional application No. 60/179,345, filed on Jan. 31, 2000, now Pat. No. 6,542,972, and provisional application No. 60/179,344, filed on Jan. 31, 2000.

(51) Int. Cl.[7] .............................................. G06F 17/30
(52) U.S. Cl. ........................................ 707/3; 707/200
(58) Field of Search ........................... 707/200, 3, 202, 707/203, 204, 205, 500.1; 711/154; 705/8

(56) References Cited

U.S. PATENT DOCUMENTS

| | | | | |
|---|---|---|---|---|
| 5,005,122 A | | 4/1991 | Griffin et al. ............... 709/203 |
| 5,212,772 A | | 5/1993 | Masters ....................... 714/20 |
| 5,287,500 A | * | 2/1994 | Stoppani, Jr. ............... 711/211 |
| 5,448,724 A | | 9/1995 | Hayashi ........................ 714/4 |
| 5,673,381 A | | 9/1997 | Huai et al. ..................... 714/1 |
| 5,751,997 A | | 5/1998 | Kullick et al. ............. 395/489 |
| 5,813,013 A | | 9/1998 | Shakib et al. .............. 707/102 |
| 5,845,257 A | * | 12/1998 | Fu et al. ......................... 705/8 |
| 6,078,934 A | * | 6/2000 | Lahey et al. ................ 715/511 |
| 6,131,190 A | * | 10/2000 | Sidwell ....................... 717/115 |
| 6,212,512 B1 | * | 4/2001 | Barney et al. ................ 707/1 |
| 6,295,541 B1 | * | 9/2001 | Bodnar et al. ............. 707/203 |

(List continued on next page.)

FOREIGN PATENT DOCUMENTS

| | | |
|---|---|---|
| EP | 0259 912 A | 3/1988 |
| EP | 0 467 546 A | 1/1992 |
| EP | 0 774 715 A | 5/1997 |
| EP | 0 809 184 A | 11/1997 |
| EP | 0 899 662 A | 3/1999 |
| WO | WO 95 13580 A | 5/1995 |

OTHER PUBLICATIONS

Luis–Felipe Cabrera, et al: "ADSM: A Multi–Platform, Scalable, Backup and Archive Mass Storage System", Digest of Papers of the Computer Society Computer Conference (Spring) Compcon, US, Los Alamitos, IEEE Comp. Soc. Press, vol. Conf. (Mar. 5, 1995), pp. 420–427.
Jander, M.: "Launching Storage–Area Net", Data Communications, US, McGraw Hill, NY, vol. 27, No. 4 (Mar. 21, 1988), pp. 64–72.
International Search Report dated Aug. 15, 2002.

*Primary Examiner*—Diane D. Mizrahi
(74) *Attorney, Agent, or Firm*—Brown, Raysman, Millstein

(57) ABSTRACT

A storage management system that manages the storage and retrieval of digital files. The storage management system includes a plurality of storage devices that may be located in different time zones. The system also includes a processor that is configured to maneuver the digital files among the plurality of storage devices according to commands that are received from software programs that operate on the processor. In one embodiment, the system includes a retrieval control while in another embodiment a storage control is included. Either embodiment takes into account the different problems that are introduced when the plurality of storage devices are located in different time zones.

39 Claims, 11 Drawing Sheets

U.S. PATENT DOCUMENTS

| | | |
|---|---|---|
| 6,314,439 B1 | 11/2001 | Bates et al. ................. 707/513 |
| 6,330,572 B1 * | 12/2001 | Sitka ......................... 707/205 |
| 6,356,801 B1 | 3/2002 | Goodman et al. .......... 700/214 |
| 6,519,679 B2 * | 2/2003 | Devireddy et al. ......... 711/114 |
| 6,538,669 B1 * | 3/2003 | Lagueux et al. ............ 345/764 |

* cited by examiner

STORAGE MANAGEMENT ACROSS MULTIPLE TIME ZONES

CROSS-REFERENCE TO RELATED APPLICATIONS

This application is a continuation-in-part of U.S. patent application Ser. No. 09/774,301, now U.S. Pat. No. 6,658,436 entitled "Logical View and Access to Data Managed by a Modular Data and Storage Management System," filed Jan. 30, 2001, pending, which claims the benefit of U.S. Provisional Application Serial No. 60/179,345, entitled "Logical View and Access to Data Managed by a Modular Data and Storage Management System," filed Jan. 31, 2000, all of which are incorporated by reference herein in their entireties. In addition, U.S. patent application Ser. No. 09/774,268 now U.S. Pat. No. 6,542,972 entitled "Logical View and Access to Physical Storage in Modular Data and Storage Management System," filed Jan. 30, 2001, which claims the benefit of U.S. Provisional Application Serial No. 60/179,344, entitled "Logical View and Access to Physical Storage in Modular Data and Storage Management System," filed Jan. 31, 2000, are incorporated by reference herein in their entireties.

BACKGROUND

1. Field of the Invention

The present invention generally relates to data storage and retrieval and more particularly to the storage management of data across multiple time zones.

2. Description of the Related Art

Conventional methods require a user to know ahead of time where exactly data is stored in order to retrieve it. The user needs to be aware of the operating system and server platform type from which the data was originated. In addition, the user needs to know the media type (magnetic disk, optical, tape, or other media) the data is stored on. Moreover, the user needs to know of the exact media on which the data is stored in addition to when and where it was stored. Systems that have been developed to address the problems of this nature have encountered challenges when storage management occurs across multiple time zones.

Many other problems and disadvantages of the prior art will become apparent to one skilled in the art after comparing such prior art with the present invention as described herein.

SUMMARY OF THE INVENTION

Various aspects of the present invention may be realized through a storage management system that includes a processor that is configured to maneuver digital files among a plurality of storage devices according to commands that are received from software programs that operate on the processor. The software programs may include a file browser operating on the processor. The file browser is configured to display selected ones of the digital files that are maneuvered among the plurality of storage devices and to enable selection of specific digital files in the storage management system when requested by a user. The storage management system also includes a retrieval control operating on the processor that receives commands from the file browser and provides the file browser with information regarding the digital files selected by the user. The information is gathered during the time that the digital files are maneuvered among the plurality of storage devices by the processor. Also included is an index in the retrieval control that stores the gathered information regarding each of the digital files for quick access when requested by the file browser. The index information is configured to account for digital files from storage devices that are located in different time zones.

The file browser of the storage management system may include a tool bar that allows access to particular characteristics of a digital file that has been stored in at least one of the plurality of storage devices. The particular characteristics may include digital file creation date, digital file backup dates, and digital file access dates. Among other things, the file browser may have a view menu that offers a user an option to select a date in which to begin displaying a history of a selected digital file(s).

Other aspects of the present invention may be realized through a data retrieval system that includes a computer system having a processor that supports operation of at least one software application that is used for retrieving data in the computer system. The data retrieval system also includes a plurality of storage media that are located in at least two time zones and that communicatively coupled to the processor. The plurality of storage media have data stored in at least one of the plurality of storage media. The software application has a retrieval module for retrieving data from the plurality of storage media. The retrieval module accounts for differences in the at least two time zones in which the plurality of storage media are located. Finally, a storage and backup map is included that indicates to the retrieval module a particular location of the data that is to be retrieved by the retrieval module.

In some embodiments, the software application of the data retrieval system includes a tool bar that allows access to particular characteristics of a file that has been stored in at least one of the plurality of storage media. The particular characteristics may be file creation date, file backup dates, and file access dates. The software application may also include a view menu that offers a user an option to select a date in which to begin displaying a history of a selected file(s).

Still other aspects of the present invention may be realized through a storage management system that includes a processor that is configured to store and maneuver digital files among a plurality of storage devices according to commands that are received from software programs that operate on the processor. A software program operating on the processor is configured to store selected ones of the digital files that are to be maneuvered among the plurality of storage devices in the storage management system. The storage occurs when requested by a user. A storage control operates on the processor and receives commands from the software program. The software program acquires information regarding the storage location of each digital file. The information is gathered during the time that the digital files are maneuvered among the plurality of storage devices by the processor. An index is associated with the storage control and stores the gathered information regarding each of the digital files for quick access when requested by the storage control. The index information is configured to account for digital files from storage devices that are located in different time zones.

The plurality of storage devices of the storage management system may include a plurality of storage media that are selected from the group consisting of magnetic tape media, magnetic disk media, and optical medial. The storage control of the storage management system often includes a manager module that interacts with a media module to compile the index to track the location of stored digital files. The storage control may also be configured to migrate selected digital files among the plurality of storage devices according to the particular storage policy. The particular storage policy is selected from the group consisting of storage sequences, storage logic, initial storage sequence selection criteria, storage sequence reselection criteria, and storage sequence adaptation criteria. The initial storage sequence selection criteria may be selected from the group consisting of user directed override, user profile, application, file type, user network location, and available storage space. The storage sequence reselection criteria may be selected from the group consisting of specific file usage history, file type usage history, user profile, user network relocation, available storage space, and added storage media. The storage sequence adaptation criteria may be selected from the group consisting of specific file usage history, user profile, user network relocation, available storage space, and added storage media.

Of course, other embodiments will become apparent to those of ordinary skill in the art upon viewing the present disclosure.

DETAILED DESCRIPTION OF THE DRAWINGS

An exemplary description of the present invention is a retrieval system that allows end users to view and access in the logical format that they commonly see in their applications or systems. The users just have to define the general outline (such as part of the file name or file path or approximately when the data may have existed or the desired point-in-time view of the data) of the data that they are looking for. The data will then be retrieved and presented to the user regardless of the media type that it was stored on or platform type on which it was controlled. The user can then select the exact version of the data desired. However, retrieving time dependent versions of data is complicated when the data to be retrieved is stored on a computer system that is located in a different time zone than the computer that is requesting the data.

It is to be understood that the present invention applies to both retrieval and storage systems, but for ease of understanding the principles according to the present invention, the figures pertain to a retrieval system. However, those skilled in the art and viewing the present disclosure will understand that the time zone characteristics of the present invention may apply equally well to a storage system.

Figure 1:
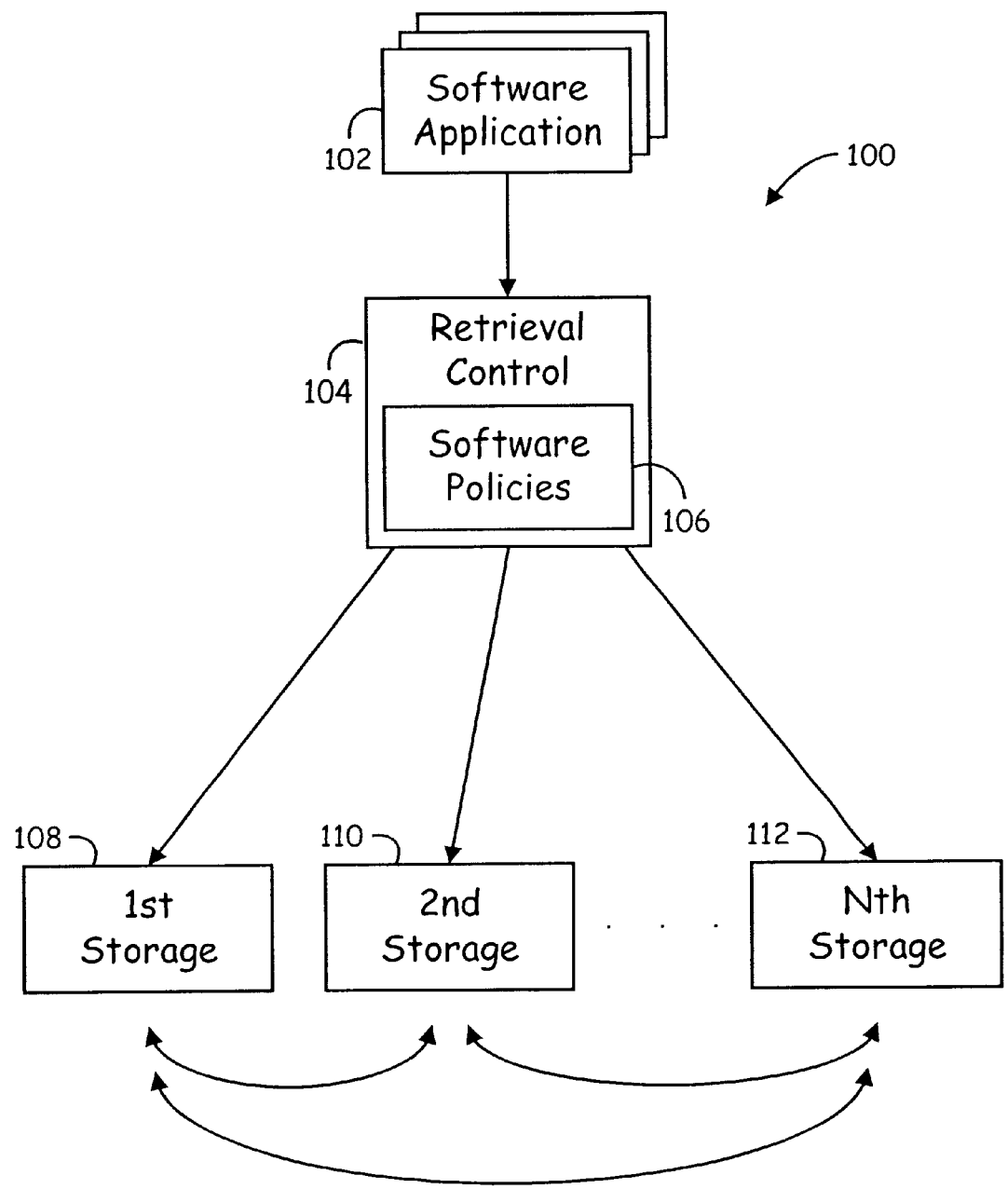
FIG. 1 is a block diagram of an exemplary embodiment of a retrieval system that operates according to principles of the present invention.

FIG. 1 is a block diagram of an exemplary embodiment of a retrieval system 100 that operates according to principles of the present invention. The retrieval system 100 includes software applications 102 that a user interacts with to retrieve data from various storage media. The software applications 102 communicate with a retrieval control 104 that determines where to retrieve data from the storage media based on instructions and information available in a storage and backup map 106. The retrieval control 104 typically receives data from the storage media that the software applications 102 have requested. When the software applications 102 request data, the retrieval control 104 determines whether to retrieve the data from a first storage media 108, a second storage media 110, or any number of other storage media down to an nth storage media 112. The various storage media 108, 110, and 112 may be located on a single computer system, distributed across a wide area network, such as the Internet, etc. When the storage media 108, 110, and 112 are distributed across the Internet, their actual physical locations may be in different time zones, for which certain adaptations are made as discussed in more detail herein. The retrieval control 104 locates the data to be retrieved according to storage information available in the storage and backup map 106 and the retrieval control 104 is then able to determine which storage media the data will be retrieved from regardless of migration of the data after initial storage in the storage media.

For example, the retrieval control 104 may retrieve data from the second storage media 110 that was initially stored in the first storage media 108 and, unbeknownst to the software applications 102 had since migrated to the second storage media 110. In addition, the retrieval control 104 could retrieve data from any other of the storage media which are illustrated. The storage and backup map 106 is continually updated when data is moved between storage media, e.g., from the first storage media 108 into the nth storage media 112. Of course, the data could be moved in either direction and between any of the storage media while the storage and backup map 106 is updated with the changes. In this manner, the software application 106 is configured to request and retrieve data from the storage media by means of a simple request for the data. Advantageously, the user is not required to know the latest location of the data in the storage media to request the data. Thus, retrieval of data from many types of storage media is available without assistance beyond the retrieval system 100 itself.

Figure 2:
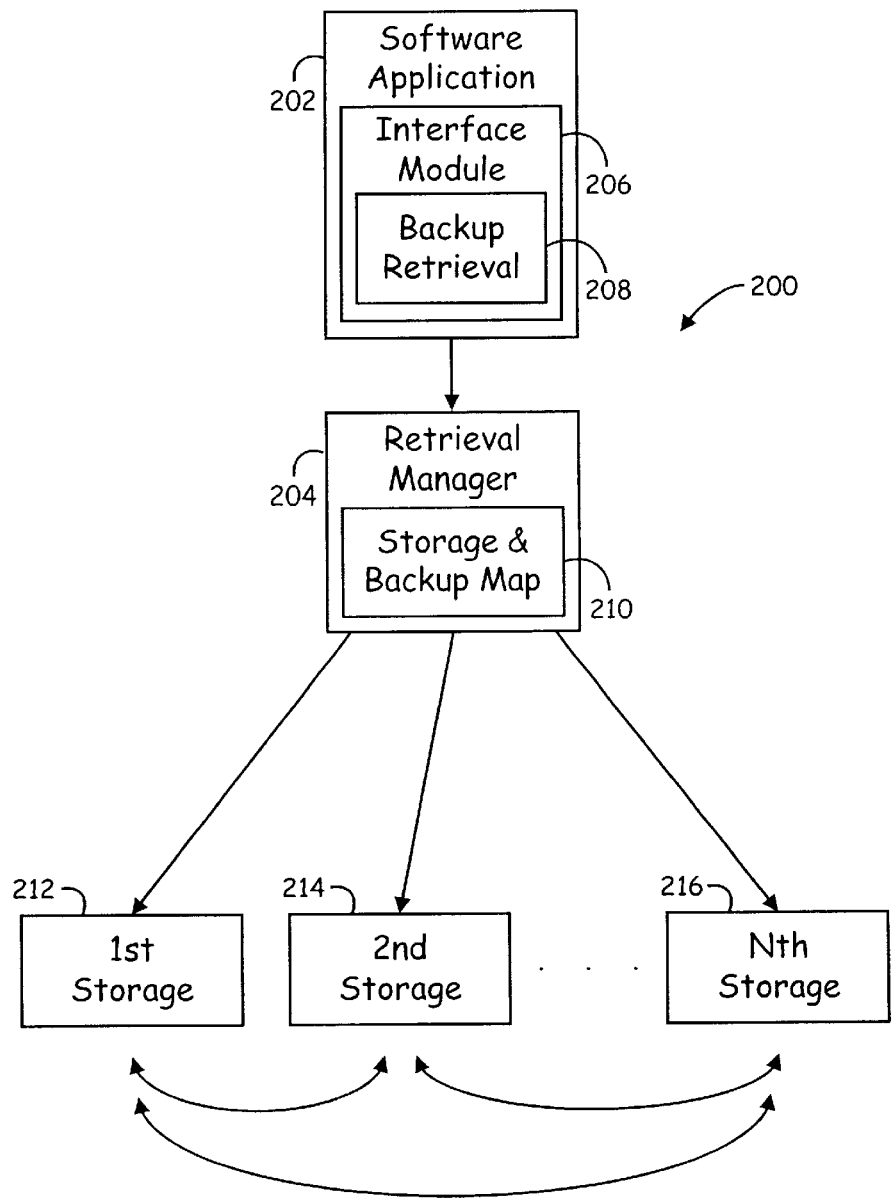
FIG. 2 is a block diagram of another exemplary retrieval system that operates in accordance with the principals of the present invention.

FIG. 2 is a block diagram of an exemplary retrieval system 200 that operates in accordance with the principals of the present invention. The retrieval system 200 includes a software application 202 and a retrieval manager 204 that interoperate to retrieve data from different storage media in the retrieval system 200. The software application 202 includes an interface module 206 and a backup retrieval 208. Thus, when the software application 202 desires to retrieve data, it begins by sending a request through the interface module 206 where the retrieval manager 204 then accesses a storage and backup map 210 to find the exact location of the data that is to be retrieved. The data may be located in a first storage media 212, a second storage media 214, or any number of storage media down to an nth storage media 216. As discussed with regard to the retrieval system 100, the storage media 212, 214, and 216 could be physically located in different time zones. The data that is to be retrieved may be stored on any of the storage media, and over time, may migrate from one storage media to the other. The storage and backup map 210 tracks the migration of the data so that the current location of the data is always available for access by the software application 202.

Figure 3:
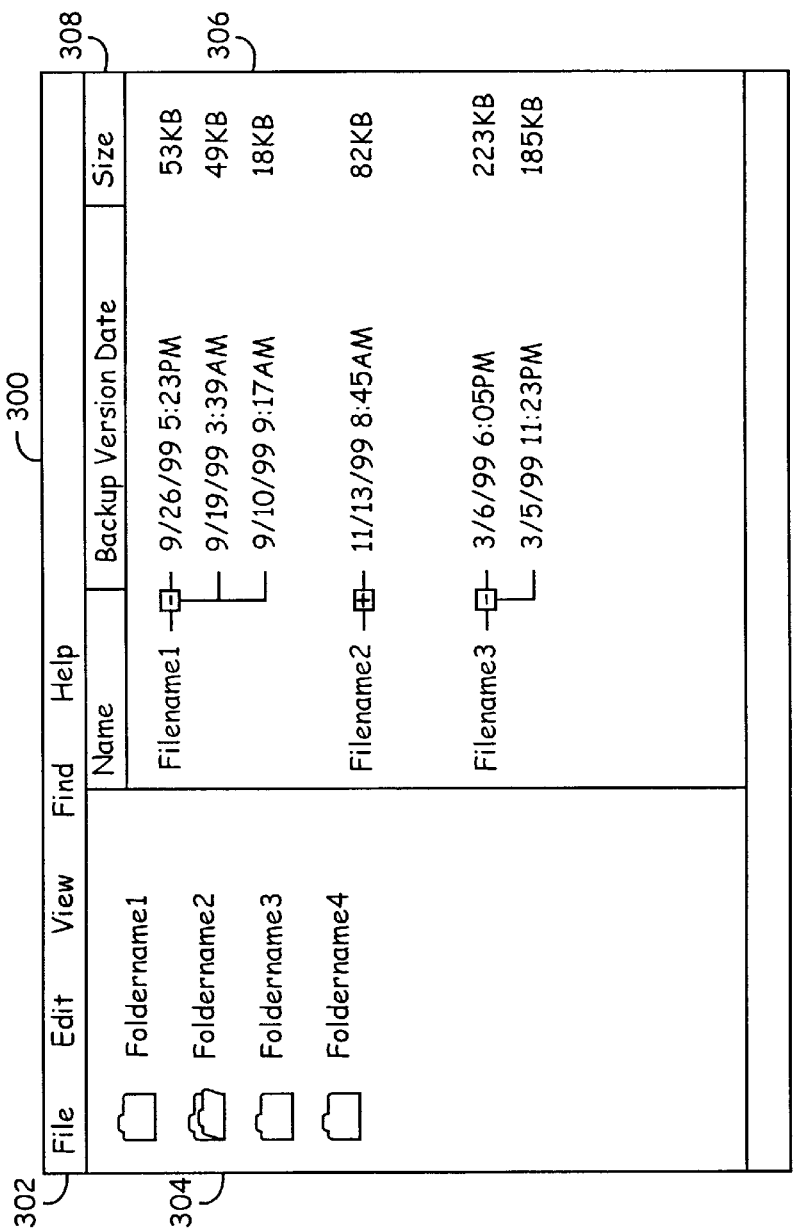
FIG. 3 is an illustration of an exemplary file browser that can be used for viewing data prior to retrieval of the data from the retrieval systems of FIGS. 1 and 2.

FIG. 3 is an illustration of an exemplary file browser 300 that can be used for viewing data prior to retrieval of the data from the retrieval systems 100 or 200. The file browser 300 includes a tool bar 302 that enables a user to access the data in various manners. Although the file browser 300 can be implemented in various manners, the file browser 300 is generally divided into a folder hierarchy 304 where folder names can be viewed and a file list 306 where particular files of the selected folder are displayed. The file list 306 includes a file information bar 308 that can be dynamically modified for viewing different information concerning the files of the file list. Corresponding to the items selected for viewing in the file information bar 308 are, first, a column reflecting the name of the files that exist in the particular folder that has been selected. In the embodiment of FIG. 3, foldername2 has been selected in the folder hierarchy 304 and filename1, filename2, and filename3 appear as the files in the foldername2. Each of the files in the file list 306 includes backup information which includes the backup date and time of the filename. This information is listed in a second column of the file list 306 under the title "backup version date" from the file information bar 308. Filename1 shows three different backup dates and times. This is because a user has opened the versions of filename1 to show other than the latest version that has been most recently saved. For example, filename2 shows the default display under the backup version portion of the file information bar 308. This is the default because a plus sign is shown and other backups that have been completed are not shown with regard to filename2. Although only 3 backups are indicated for filename1, other files that are displayed in the file list 306 may contain many more backups based on the history of the file. The third column indicates the size of the files at the time they were backed up.

As stated, the backup information for each of the files in the file list 306 is only an exemplary representation of the information that could be displayed. However, for ease of understanding the present invention, backup information will be used herein. For example, the backup information of filename1 is displayed in the file list 306. Although not apparent from the backup list, each backup may be physically located at a different storage media due to file migration in the retrieval control of the computer system. Time zone difficulties may arise when the backup changes its physical location to a storage media of another time zone prior to the backup being accessed, i.e., the backup is migrated to a storage media that is located in a different time zone than where it was originally created. This is a difficulty because a backup that was created at 9:17 AM in the first time zone may have been moved to another time zone where no backup exists with a 9:17 AM time stamp. This difficult is resolved when the retrieval system changes the backup time indication to an appropriate time for the backup when the backup is moved into a storage media of another time zone.

In another embodiment, the backup retains its time stamp regardless of the time zone into which it is moved, however, the difficulty with the time zone change occurs when the backup is to be migrated at a particular time in reference to the original time stamp in the first time zone. For example, the original backup may have occurred at 9:17 AM and a scheduled migration is 48 hours from the time of the backup, which would be two days later and at 9:17 AM on the original system. In the event that a migration occurs that places the backup into another time zone prior to expiration of the 48 hours on the original system, the scheduled 48 hour migration must occur at a different time than 9:17 AM on the current system, e.g., the migration on the current system would need to occur at 10:17 AM on the current system if the current system is in a time zone that is one hour different than the original system. In other words, to correspond with 48 hours from 9:17 AM on the original system, the migration needs to occur one hour off from 9:17 AM on the current system. Of course, if the time zone difference were two hours, the migration would need to occur two days later and two hours off from 9:17 AM on the current system.

In one embodiment, backups are always performed by the original system and the file retains its time stamp from the original system regardless of the moves that the file makes after its initial storage by the original system. In this manner, time stamps of backups correlate to the same time zone regardless of file location. The retrieval control/manager 104/204 is configured to recognize that files to be retrieved may have time stamps that are inconsistent with the time system on which the file is located.

Figure 4:
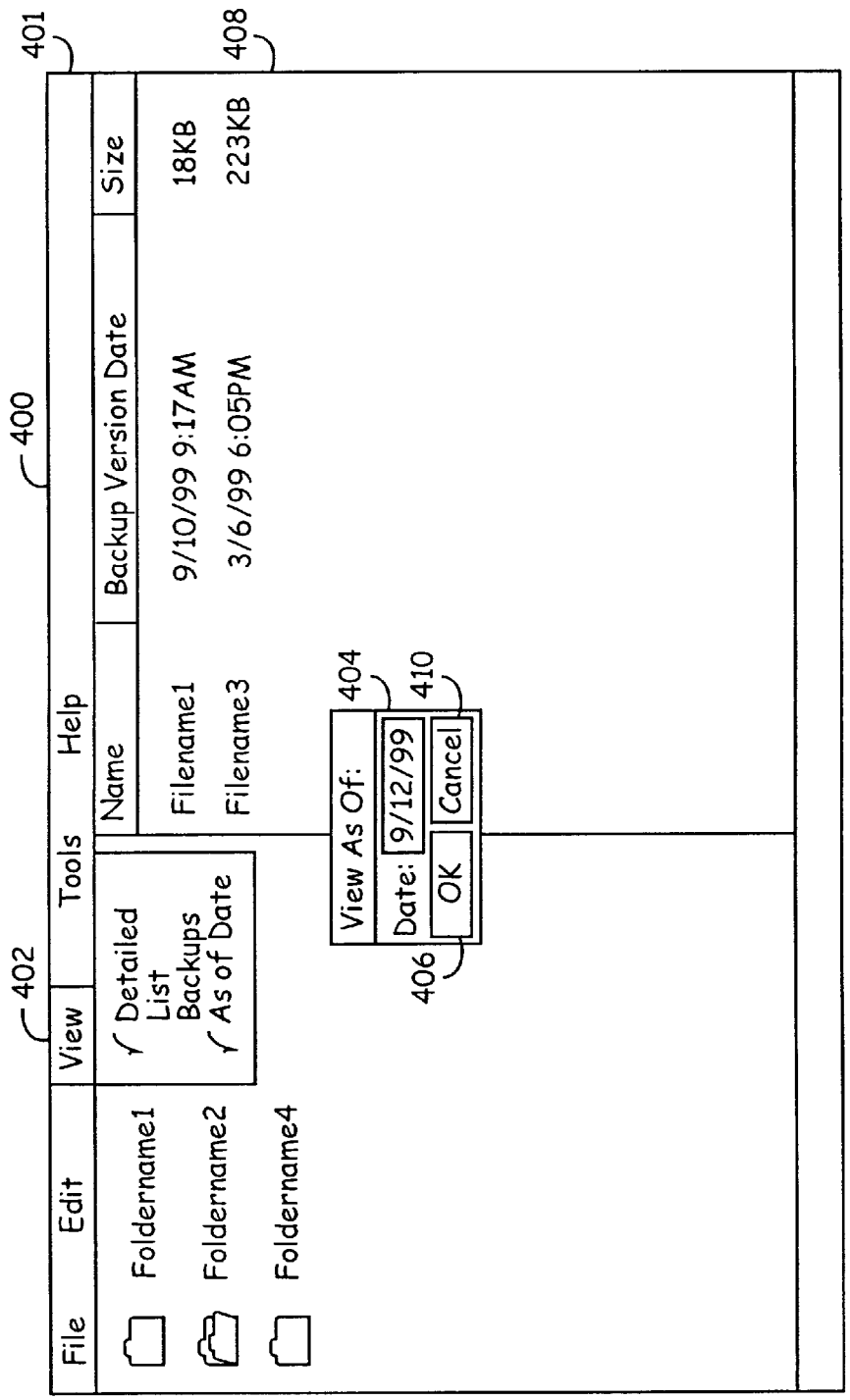
FIG. 4 is an exemplary file browser illustrated in accordance with principals of the present invention.

FIG. 4 is an exemplary file browser 400 illustrated in accordance with principals of the present invention. The file browser 400 includes a toolbar 401 similar to the file browser 300 and specifically, the view menu 402 of the tool bar is illustrated to indicate that a user may select what portions of a file to view. As illustrated, a user may select a detailed display of a file and a date for which the user desires to view the history of the file. For example, if the user selects "as of date" as illustrated, a view "as of date" box 404 appears on the file browser 400. The user may select the date of interest for file viewing. For example, the user may desire to see all backups that have been made of files that are in foldername2 as of Sep. 12, 1999. When the user makes the selection, the user will press an okay button 406 and the files that are displayed in file list 408 will only include those files which existed prior to Sep. 12, 1999. Thus, a quick comparison of the files shown in the file list 408 to those files shown in the file list 306, show dates earlier than Sep. 12, 1999. Of course, the view "as of date" box 404 could be modified to include a time selection as well as a day selection, but for ease of understanding only a day box is illustrated. If the user has selected the view "as of date" box 404 but decides not to view a particular date, the user may press a cancel button 410 to return to the regular features of the file browser 400. Of course, differing time zones may be accounted for by configuring the file browser 400 to ignore time differences that are introduced when files are accessed from computer systems programmed for a different time zone.

Figure 5:
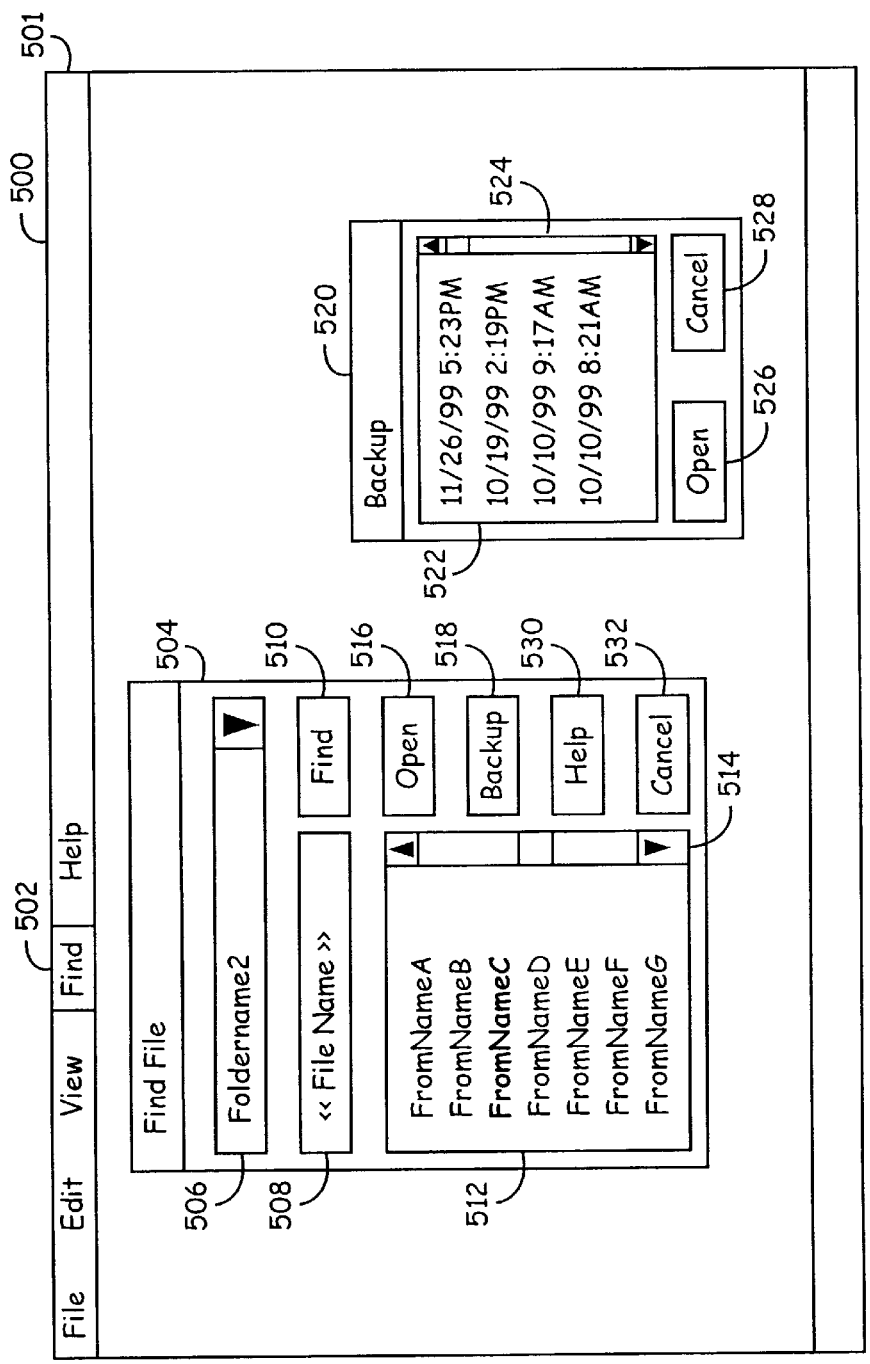
FIG. 5 is an exemplary file browser where an exemplary find mechanism is illustrated.

FIG. 5 is an exemplary file browser 500 where an exemplary find mechanism is illustrated. The file browser 500 has a tool bar 501 that includes a find menu 502. A user may select the find menu 502 to produce a find dialog box 504. The find dialog box 504 includes a folder selector box 506 where the user may select a particular folder in which to search for a particular file. After selection of the particular folder to search, the user may enter a file name for which to search. This file name would be entered in a file name search box 508. Of course, the file name may be entered with wild cards or other search techniques which are commonly available in most operating systems. After a file is entered into the file name search box 508, the user may press a find button 510 and the search results are displayed in a found file box 512. The user may use a scroll bar 514 for scrolling up and down the file list that is displayed in the found file box 512. To avoid time zone problems, relevant information associated with the files of the found file box 512 is located in the storage and backup maps 106, 210, or equivalent module, and is accessible by the file browser 500.

When a user finds the file which they were searching for, the user may press the open button 516 to view the file. A backup button 518 is also available for a user to list the backup information for the particular file which they are searching. When the backup button 518 is pressed, a backup window 520 appears on the file browser 500 and a list of backup dates 522 is shown for the user to view. The user may scroll through the list of backup dates using scroll bar 524, but other techniques may be available for searching the list of files that show up in the backup box 520. When the user finds a particular backup date of interest, the user may open that file using an open button 526. When the user has completed viewing the files in the backup box 520, the user may cancel viewing the backup box 520 by pressing a cancel button 528. A cancel button 532 is also available to cancel out of the find dialog box 504 completely. If the user is in need of further assistance the user may also press a help button 530. Upon pressing the help button 530, the user is given help in formats similar to a typical operating system help function.

Figure 6:
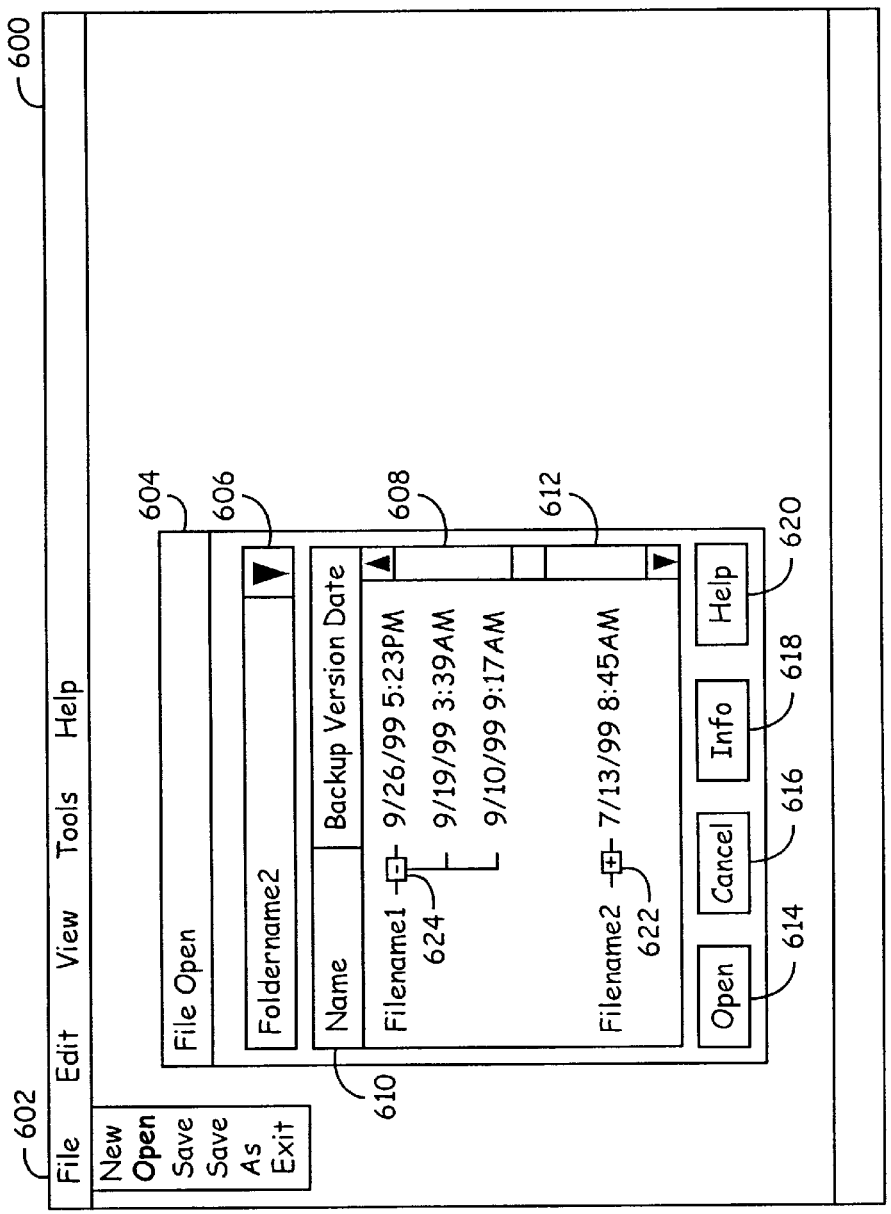
FIG. 6 illustrates an exemplary standard Windows application and how the retrieval system of the present invention may interact therewith.

FIG. 6 illustrates an exemplary standard Windows application 600 and how the retrieval system of the present invention may interact therewith. The standard Windows application 600 may be an application such as a word processing application and a file menu 602 may be entered when a user desires to open a file. The user will select the open option of the file menu 602 and a file open application will intercept the request to the operating system to open a file open dialog box 604.

The file open box 604 includes a folder selector box 606 where a user may enter the name of the desired folder to enter. Upon determining a folder name, e.g., foldername2, a file list 608 is displayed. The file list 608 includes a file information bar 610 that is modifiable but is shown including a name column and a backup version date column. As with other embodiments, the file names may be listed in the file list 608 with a default backup version date of the last backup that was completed for each file or the last save that was performed on each file. If a user desires to see a detailed history of backup dates, the user may press a plus button 622 which will then change to a minus button 624 as illustrated in the file list 608. A scroll bar 612 is illustrated as a tool for a user to scroll through different file names to find the file which the user may desire to retrieve.

When a user has found the file of interest, the user may press an open button 614 to open the particular file. If a user is unable to find the desired file or desires to exit the file open dialog box 604, the user may press a cancel button 616 to exit the file open dialog box 604. The user is also able to press an information button 618 to get further information concerning each of the files. The information button 618 may allow the user to select particular options such as an "as of date", a specific date, or even a range of dates. The file open dialog box 604 is illustrated with a help button 620 that can also operate similar to common operating system help buttons.

Figure 7:
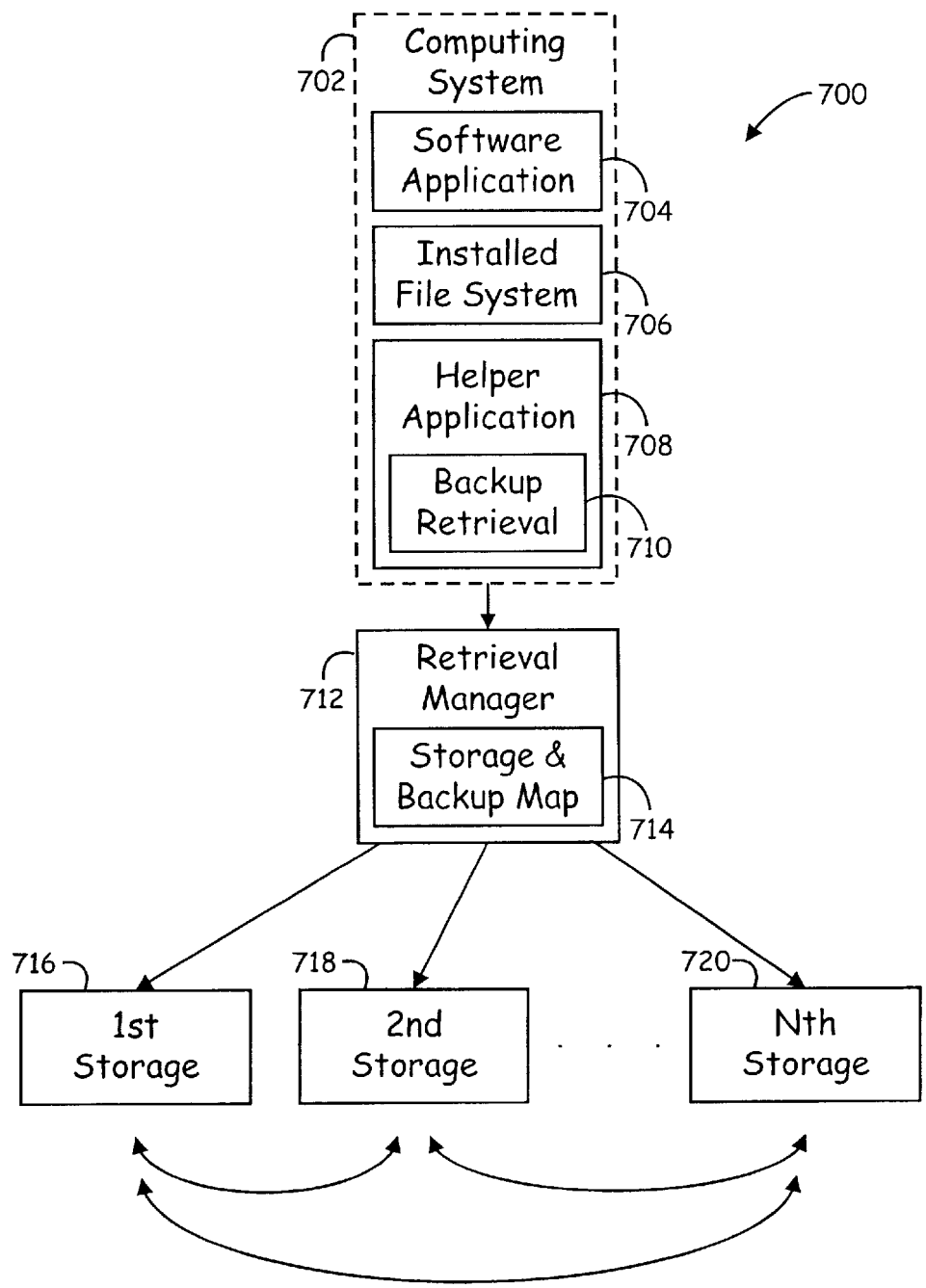
FIG. 7 is an exemplary retrieval system wherein a computing system is illustrated and is similar to the software application of FIG. 2.

FIG. 7 is an exemplary retrieval system 700 wherein a computing system 702 is illustrated and is similar to the software application 202. The computing system 702 includes a software application 704 that interacts with an installed file system 706 and a helper application 708. The helper application 708 includes a backup retrieval module 710 for interacting with a retrieval manager 712. The retrieval manager 712 interacts with storage media by obtaining information from a storage and backup map 714. In this manner, the computing system 702 can retrieve data from any one of a first storage media 716, a second storage media 718, . . . and nth storage media 720. As previously explained, data on the storage media may migrate from one storage media to another depending on various storage policies.

Figure 8:
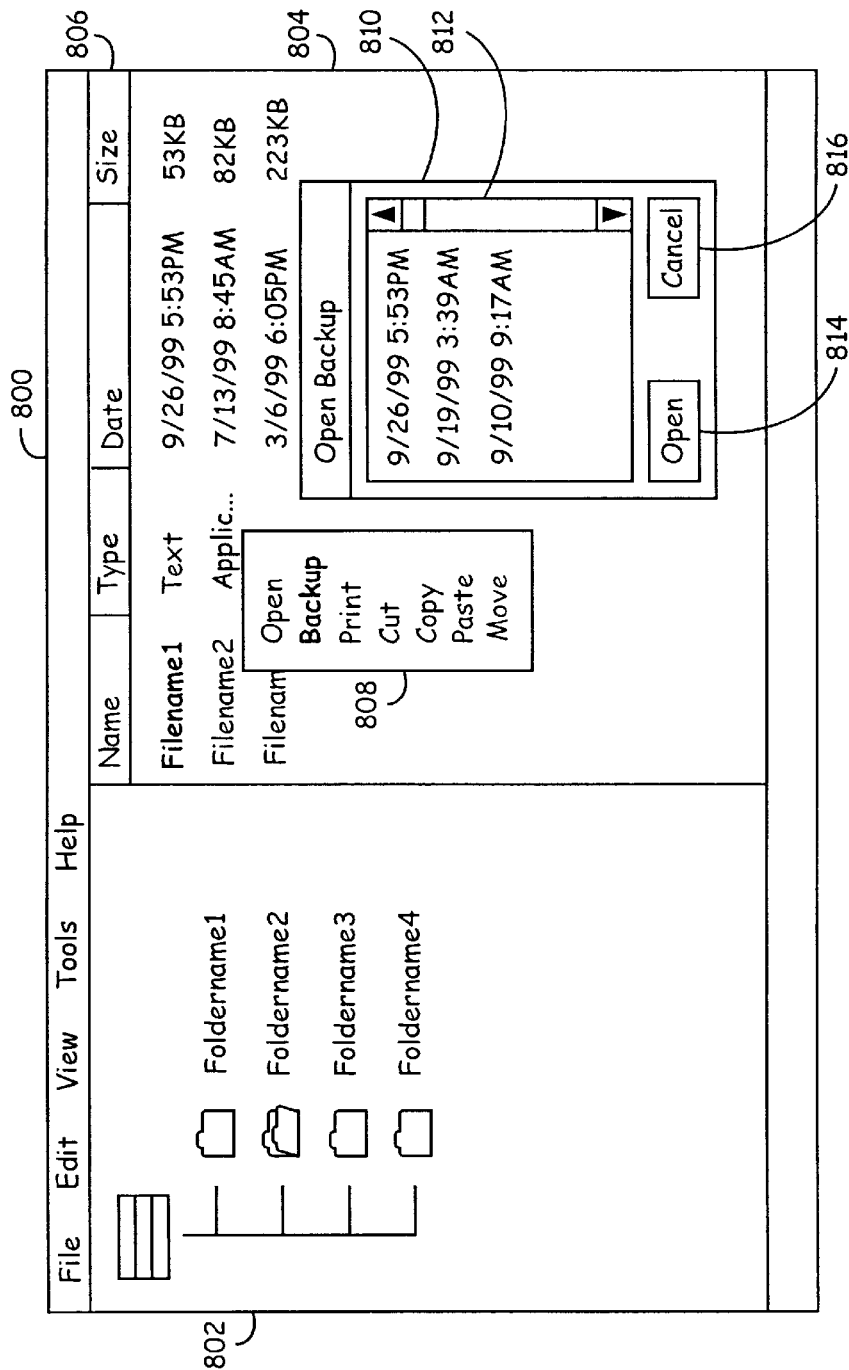
FIG. 8 illustrates an exemplary Windows application such as Windows Explorer as it operates under principles according to the present invention.

FIG. 8 illustrates an exemplary Windows application 800 such as Windows Explorer. The Windows application 800 includes many of the same features as are commonly available on most Windows application. However, if the Windows application 800 is Windows Explorer, only a single parent directory rather than numerous drives are illustrated in a folder hierarchy 802 on the left half of the windows application 800. On the right half of the Windows application 800 is illustrated a file list 804. The file list 804 includes a file information bar 806 that is dynamic and may be changed to reflect various pieces of information regarding the files in the file list 804.

When a user views a file of interest from the file list 804, the user may access an operations menu 808 that is available by right clicking on the file of interest or through other standard Windows operations. The options menu 808 is a standard Windows option menu but includes additional features such as a "backup" selection. If the user selects the backup option from the options menu 808, a backup dialog box 810 opens. The backup dialog box 810 includes a list of dates for which the particular file was backed up over time. The different dates may be viewed through movement of a scroll bar 812 by the user. If the user finds a file of interest in the backup dialog box 810, the user may open the particular file by clicking on the file and then clicking on an open button 814 to open the file. To open the file, the user may also double click on the file of interest as is commonly done in standard operating systems. Those skilled in the art and viewing this disclosure will understand that various other options may be available for selecting a particular file to view. When the user is complete with the backup dialog box 810, the user may press a cancel button 816 to exit the backup dialog box 810.

Figure 9:
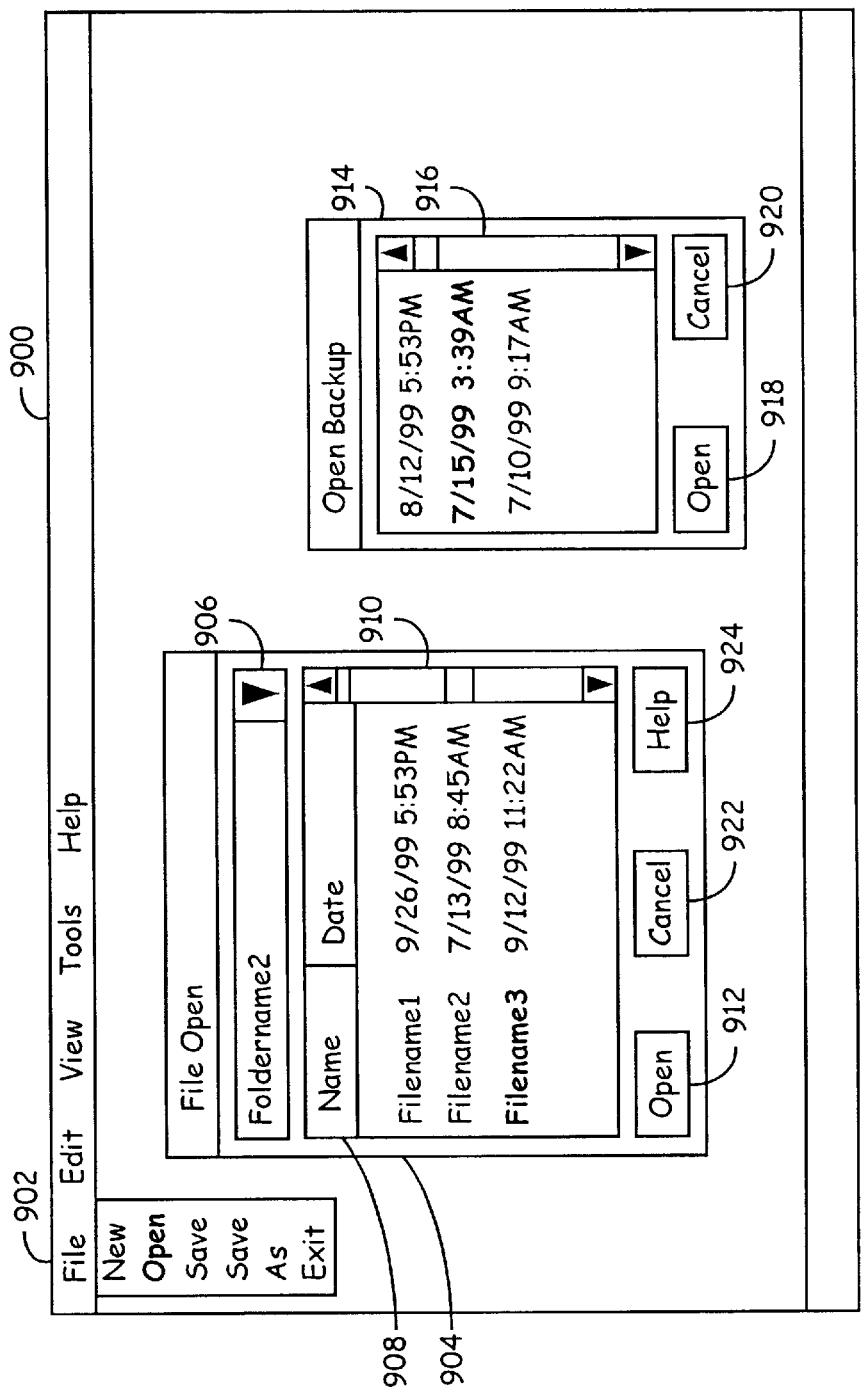
FIG. 9 illustrates another exemplary standard Windows application as it may interact with the retrieval system of the present invention.

FIG. 9 illustrates another exemplary standard Windows application 900 as it may interact with the retrieval system of the present invention. In the Windows application 900, a file menu 902 is used to open a file. When a user selects the open option of the file menu, a file open dialog box 904 appears on the Windows application 900. This file open dialog box 904 is not the standard Windows operating system dialog box but is produced by an application that intercepted the command from the open menu 902 when the user selected it, thereby allowing the file open dialog box 904 to be activated rather than the standard Windows open dialog box. The file open dialog box 904 includes a folder selector box 906 where the user may select a particular folder to find the file of interest to open. Upon selection of the appropriate folder in the folder selector box 906, a list of available files is shown in the file open dialog box 904.

The file open dialog box 904 includes a file information bar 908 that is adjustable to reflect the information that the user desires to view in the file list. In the file information bar 908 illustrated in FIG. 9, only a name column and a date column are illustrated, but the options could be modified according to a user's needs. The files listed in the file open dialog box 904 can be viewed through use of a scroll bar 910. When the appropriate file is found, the user may select the file, in this example filename3, and open the file immediately with an open button 912. However, the user may desire to view backup copies of filename3 and therefore right click on filename3 to select an open backup dialog box 914.

The open backup dialog box 914 lists the backups that have been performed for the filename3, and the user is able to scroll through these backups to find the appropriate backup date by using a scroll bar 916. Of course, other options for finding the appropriate backup file are available and this illustration is exemplary only. When the appropriate backup date is found, the user may press an open button 918 to open the version of the file that has been selected. When the user has completed using the open backup dialog box 914, the user may press a cancel button 920 to exit the window and return to the file open dialog box 904. At this point, the user may press a cancel button 922 to exit the file open dialog box 904. A help button 924 is available as in a manner that is similar to standard operating system help buttons.

Figure 10:
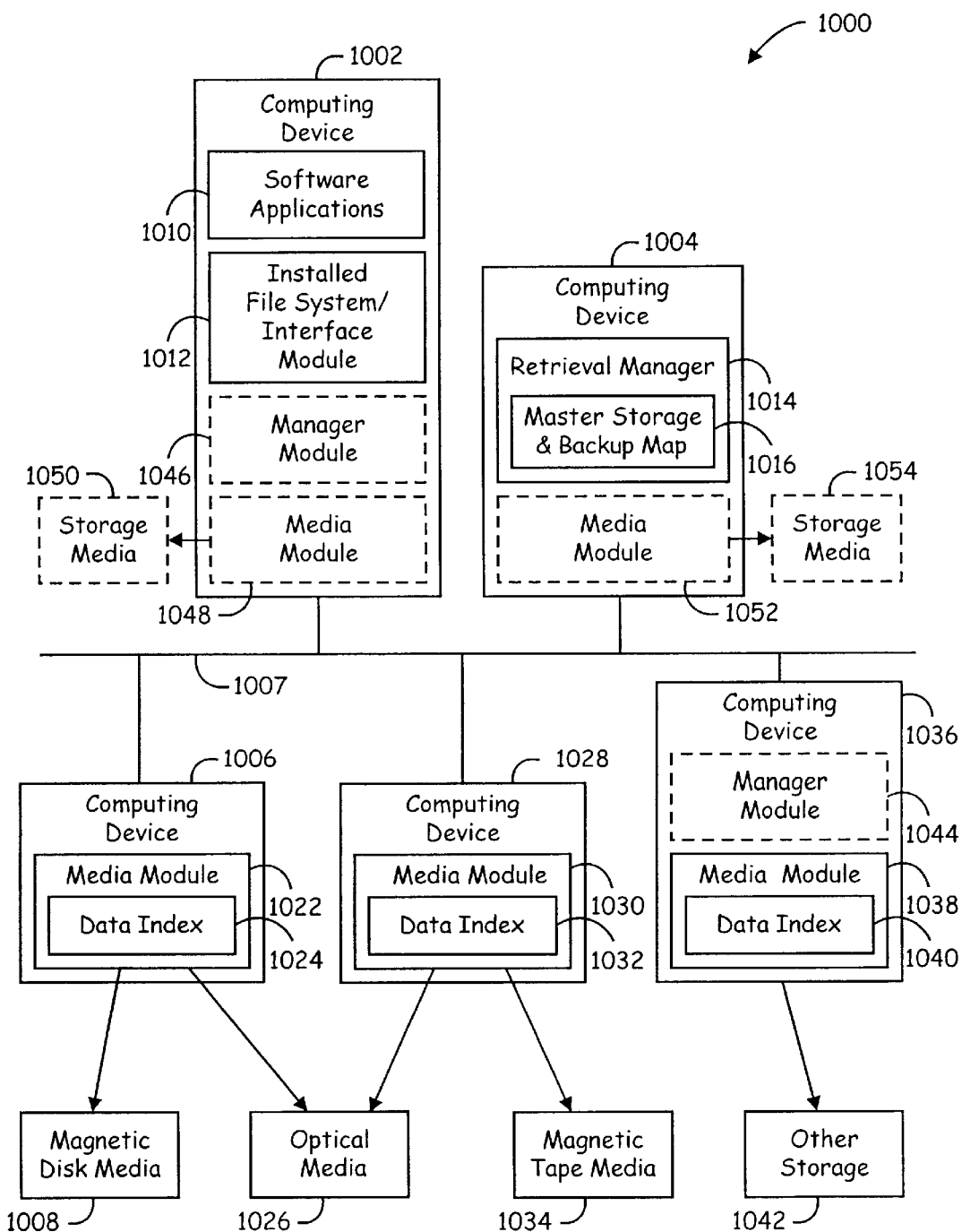
FIG. 10 is a block diagram of an exemplary retrieval system that is illustrated in greater detail than the retrieval systems of previous figures of the present disclosure.

FIG. 10 is a block diagram of an exemplary retrieval system 1000 that is illustrated in greater detail than earlier retrieval systems of the present disclosure. The retrieval system 1000 includes a computing device 1002, a computing device 1004, and a computing device 1006 that are interconnected and communicate with one another wia a network 1007. The computing device 1006 includes a magnetic disk media 1008 for storage of data that the computing device 1006 receives from the computing device 1002.

The computing device 1002 includes software applications 1010 and installed file system 1012. The installed file system 1012 works with an interface module to retrieve data in the retrieval system 1000. When data is to be retrieved for the software application 1010, the installed file system/interface module 1012 begins interacting with a retrieval manager 1014 of the computing device 1004. The retrieval manager 1014 includes a master storage and backup map 1016. In this embodiment, when the software application 1010 is directed to retrieve data, the data is sent to the installed file system/interface module 1012 and then to the software applications 1010. To find the location of the data that is to be retrieved, the retrieval manager 1014 views the information in the master storage and backup map 1016. The information from the retrieval manager 1014 is passed to the installed file system/interface module 1012 so that the computing device that knows the exact location of the data is then known and can be retrieved from the storage media.

For example, computing device 1006 may be where the system looks to retrieve the data of interest. The computing device 1006 includes a media module 1022 having a data index 1024 that would indicate the specific location of the data to be retrieved. This data will be stored in a storage media such as the magnetic disk media 1008 or optical media 1026. Of course, other types of storage media are available and more than two storage media could be available from the computing device 1006. When the data is found, it is then passed back to the software applications 1010 through the network 1007.

The retrieval manager 1014 of the computing device 1004 may indicate that the data is stored at computing device 1028 based on the information found on the master storage and backup map 1016. In this case, the retrieval system 1000 must look to a media module 1030 of the computing device 1028 where a data index 1032 indicates the exact location of the data to be retrieved. In this example, the data may be located in a magnetic tape media 1034 or other media. in addition, the retrieval manager 1014 may indicate that the data can be found by looking to computing device 1036 where a media module 1038 uses data index 1040 to find the exact location of the data on other storage 1042.

It is understood that data may migrate from one storage media to another and the original location where the data is stored may vary over time. However, the movement of data is tracked by the respective data indexes 1024, 1032, and 1040, so that wherever the data happens to be currently located, the software application 1010 may retrieve the data without undo delay or undesired assistance.

Multiple variations exist for the retrieval system 1000 as shown by components illustrated in dashed lines. Specifically, a manager module 1046 may exist in the computing device 1002 where it interacts with a media module 1048 to obtain data directly from storage media 1050 without having to interact with other computing devices. In other embodiments, a media module 1052 may be located in the computing device 1004 where data is found in storage media 1054. In another embodiment, a manager module 1044 may be present in the computing device 1036. Those skilled in the art and viewing the present disclosure will understand that numerous possibilities exist using the same concepts.

Figure 11:
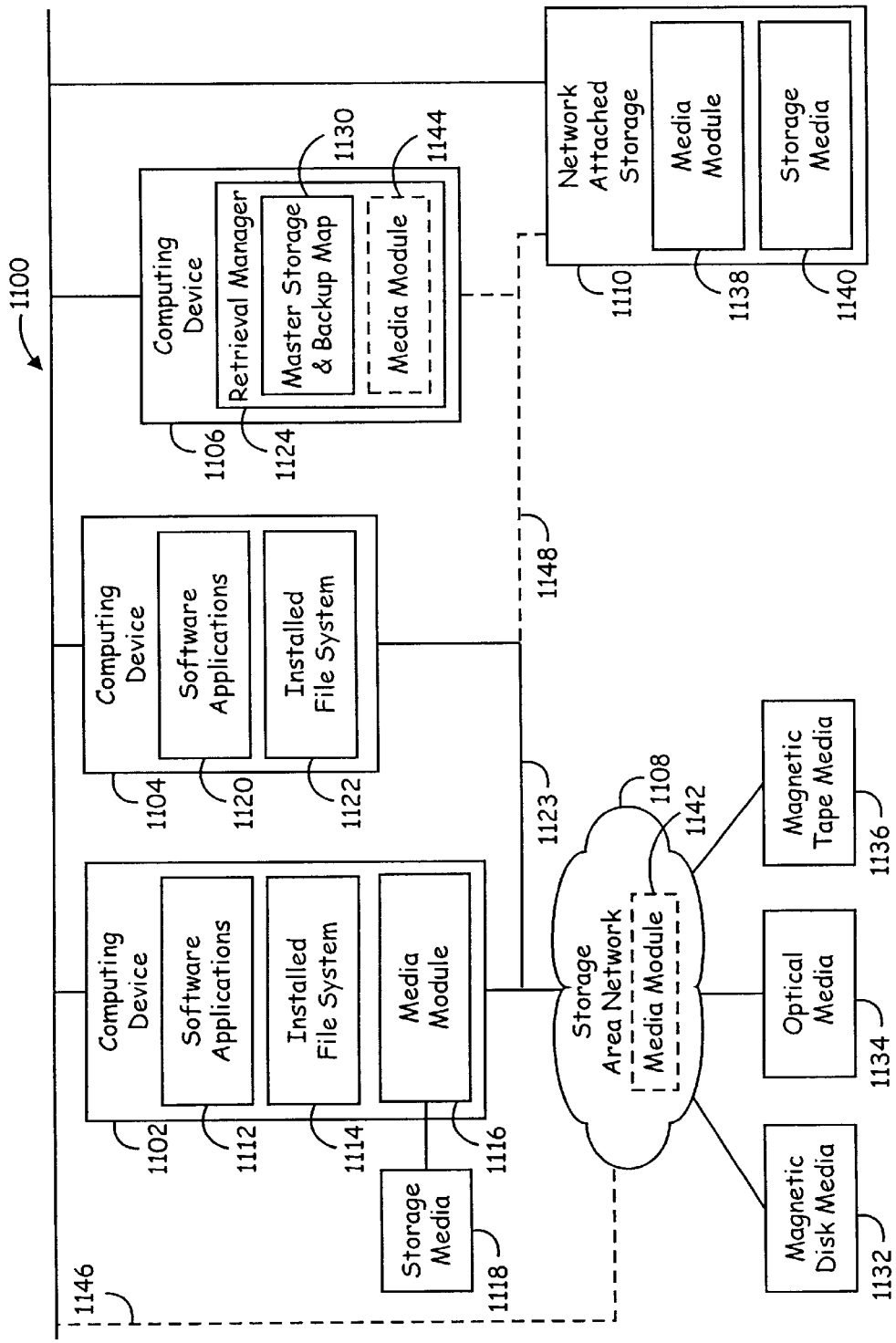
FIG. 11 is a block diagram of another exemplary retrieval system.

FIG. 11 is a block diagram of another exemplary retrieval system 1100. The retrieval system 1100 includes a computing device 1102, a computing device 1104, and a computing device 1106. The computing devices 1102, 1104, and 1106 interact to retrieve data through either a storage area network 1108 or a network attached storage 1110.

For example, computing device 1102 includes a software application 1112 that interacts with an installed file system 1114. The installed file system 1114 interacts with a media module 1116 that could indicate that the data to be retrieved is located in storage media 1118. Alternatively, computing device 1104 includes software applications 1120 that interacts with the installed file system 1122 to retrieve data. For the computing device 1104 to retrieve data, the installed file system 1122 may have to interact with the computing device 1106 because the computing device 1106 includes a retrieval manager 1124 that includes a master storage and backup map 1130. When the information for retrieval is located, the information is passed back to the computing device 1104 and to the installed file system 1122.

This information may be used by the installed file system 1122 to locate information that is stored on the storage area network 1108. Of note, the storage area network 1108 is connected to the computing devices 1102 and 1104 through a high-speed fibre network 1123. For example, the data may be located on a magnetic disk media 1132, optical media 1134, or a magnetic tape media 1136. The installed file system 1122 will have the information that the storage area network 1108 needs to access the specific information. On the other hand, the installed file system 1122 may understand from the computing device 1106 that the information to be retrieved is located in the network attached storage 1110. If this is the case, the network attached storage 1110 has a media module 1138 where the exact location of the data is found in a storage media 1140.

As illustrated by dashed lines, numerous variations may be made to the illustrated retrieval system 1100. For example, the storage area network 1108 may include a media module 1142 so that the computing device 1104 does not need to communicate with both a computing device 1106 and a computing device 1102 to access data across the fibre network 1123 from the storage area network 1108. In addition, a media module 1144 may be located in the computing device 1106 to alter the data accessing techniques of the retrieval system 1100.

Dashed lines also indicate that the storage area network may be connected directly to the network 1146 of the computing devices and dashed lines 1148 indicate that the network attached storage may be connected through the fibre network 1123 to the computing devices 1102, 1104 or across a regular network to the computing device.

What is claimed is:

1. A data retrieval system comprising:
   a computer system having a processor that supports operation of at least one software application that is used for retrieving data in the computer system;
   a plurality of storage devices that are located in at least two time zones and communicatively coupled to the processor, the plurality of storage devices having data stored in at least one of the plurality of storage devices;
   the software application having a retrieval module for retrieving data from the plurality of storage devices, the retrieval module accounting for differences in the at least two time zones in which the plurality of storage devices are located;
   a storage and backup map that indicates to the retrieval module a particular storage device storing the data that is to be retrieved by the retrieval module; and
   a data index stored on at least one of said plurality of storage devices that indicates to the retrieval module a particular location of the data that is to be retrieved by the retrieval module.

2. The data retrieval system of claim 1, wherein the software application includes a tool bar that allows access to particular characteristics of a file that has been stored in at least one of the plurality of storage devices.

3. The data retrieval system of claim 2, wherein the particular characteristics comprise file creation date, file backup dates, and file access dates.

4. The data retrieval system of claim 1, wherein the software application comprises a view menu that offers a user an option to select a date in which to begin displaying a history of a selected file(s).

5. A method for retrieving selected data in a computer system, the computer system having a plurality of storage media where data is stored, the storage media being located in at least two time zones and communicatively coupled to a plurality of computing devices, the method comprising:
   selecting one of the plurality of computing devices storing the selected data based upon instructions contained in a storage map;
   determining, according to a data index stored on the selected computing device, a particular location of the selected data on the plurality of storage media;
   accounting for differences in the at least two time zones in which the plurality of storage media are located; and
   displaying an indication of the selected data such that a user has an option of gaining additional information regarding the selected data.

6. The method of claim 5, comprising selecting the indication to display a backup history of a portion of the selected data.

7. The method of claim 5, comprising selecting the indication to display a history of access times for a portion of the selected data.

8. The method of claim 5, comprising selecting the indication to display an origination date of a portion of the selected data.

9. The method of claim 5, comprising migrating the selected data among the plurality of computing devices according to a particular storage policy.

10. The method of claim 9, comprising selecting the particular storage policy from the group consisting of storage sequences, storage logic, initial storage sequence selection criteria, storage sequence resolution criteria, and storage sequence adaptation criteria.

11. The method of claim 10, comprising selecting the initial storage sequence selection criteria from the group consisting of a user directed override, a user profile, an application, a file type, a user network location, and available storage space.

12. The method of claim 10, comprising selecting the storage sequence reselection criteria from the group consisting of specific file usage history, file type usage history, a user profile, a user network relocation, available storage space, and added storage media.

13. The method of claim 10, comprising selecting the storage sequence adaptation criteria from the group consisting of specific file usage history, a user profile, a user network relocation, available storage space, and added storage media.

14. The method of claim 5, comprising:
   migrating at least a portion of the selected data from a first storage media in a first time zone to a second storage media in a second time zone; and
   associating a time stamp from the first storage media with the at least a portion of the selected data migrated to the second storage media.

15. The method of claim 5, comprising retrieving the selected data from the particular location of the selected data on the plurality of storage media.

16. The method of claim 15, comprising retrieving the selected data using a retrieval control module.

17. A system for retrieving stored data in a computer storage management system, the system comprising:
   a plurality of storage media where data is stored, the storage media being located in at least two time zones and communicatively coupled to a plurality of computing devices; and
   a retrieval control module communicatively coupled to the plurality of computing devices;
   wherein the retrieval control module is configured to select one of the plurality of computing devices storing the selected data based upon instructions contained in a storage map;
   wherein the selected computing device is configured to determine, according to a data index stored on the selected computing device, the particular location of the selected data on the plurality of storage media; and
   wherein the retrieval control is configured to account for differences in the at least two time zones in which the plurality of storage media are located and to display an indication of the selected data such that a user has an option of gaining additional information regarding the selected data.

18. The system of claim 17, wherein the indication comprises a backup history of a portion of the selected data.

19. The system of claim 17, wherein the indication comprises a history of access times for a portion of the selected data.

20. The system of claim 17, wherein the indication comprises an origination date of a portion of the selected data.

21. The system of claim 17, wherein the retrieval control module is configured to migrate the selected data among the plurality of computing devices according to a particular storage policy.

22. The system of claim 21, wherein the retrieval control module selects the particular storage policy from the group consisting of storage sequences, storage logic, initial storage sequence selection criteria, storage sequence resolution criteria, and storage sequence adaptation criteria.

23. The system of claim 22, wherein the retrieval control module selects the initial storage sequence selection criteria from the group consisting of a user directed override, a user profile, an application, a file type, a user network location, and available storage space.

24. The system of claim 22, wherein the retrieval control module selects the storage sequence reselection criteria from the group consisting of specific file usage history, file type usage history, a user profile, a user network relocation, available storage space, and added storage media.

25. The system of claim 22, wherein the retrieval control module selects the storage sequence adaptation criteria from the group consisting of specific file usage history, a user profile, a user network relocation, available storage space, and added storage media.

26. The system of claim 17, wherein the retrieval control module is configured to migrate at least a portion of the selected data from a first storage media in a first time zone to a second storage media in a second time zone and associate a time stamp from the first storage media with the at least a portion of the selected data migrated to the second storage media.

27. The system of claim 17, wherein the retrieval control module is configured to retrieve the selected data from the particular location of the selected data on the plurality of storage media.

28. A computer usable medium or media storing program code which, when executed on a computerized device, causes the computerized device to execute a method for retrieving selected data in a computer system, the computer system having a plurality of storage media where data is stored, the storage media being located in at least two time zones and communicatively coupled to a plurality of computing devices, the method comprising:
    selecting one of the plurality of computing devices storing the selected data based upon instructions contained in a storage map;
    determining, according to a data index stored on the selected computing device, a particular location of the selected data on the plurality of storage media;
    accounting for differences in the at least two time zones in which the plurality of storage media are located; and
    displaying an indication of the selected data such that a user has an option of gaining additional information regarding the selected data.

29. The computer usable medium or media of claim 28, the method further comprising selecting the indication to display a backup history of a portion of the selected data.

30. The computer usable medium or media of claim 28, the method further comprising selecting the indication to display a history of access times for a portion of the selected data.

31. The computer usable medium or media of claim 28, the method further comprising selecting the indication to display an origination date of a portion of the selected data.

32. The computer usable medium or media of claim 28, the method further comprising migrating the selected data among the plurality of computing devices according to a particular storage policy.

33. The computer usable medium or media of claim 32, the method further comprising selecting the particular storage policy from the group consisting of storage sequences, storage logic, initial storage sequence selection criteria, storage sequence resolution criteria, and storage sequence adaptation criteria.

34. The computer usable medium or media of claim 33, the method further comprising selecting the initial storage sequence selection criteria from the group consisting of a user directed override, a user profile, an application, a file type, a user network location, and available storage space.

35. The computer usable medium or media of claim 33, the method further comprising selecting the storage sequence reselection criteria from the group consisting of specific file usage history, file type usage history, a user profile, a user network relocation, available storage space, and added storage media.

36. The computer usable medium or media of claim 28, the method further comprising selecting the storage sequence adaptation criteria from the group consisting of specific file usage history, a user profile, a user network relocation, available storage space, and added storage media.

37. The computer usable medium or media of claim 28, the method further comprising:
    migrating at least a portion of the selected data from a first storage media in a first time zone to a second storage media in a second time zone; and
    associating a time stamp from the first storage media with the at least a portion of the selected data migrated to the second storage media.

38. The computer usable medium or media of claim 28, the method further comprising retrieving the selected data from the particular location of the selected data on the plurality of storage media.

39. The computer usable medium or media of claim 38, the method further comprising retrieving the selected data using a retrieval control module.

* * * * *